United States Patent [19]
Arvidsson

[11] 3,773,199
[45] Nov. 20, 1973

[54] REMOVABLY SUPPORTED LORRY PLATFORM

[75] Inventor: Carl-Eric Arvidsson, Laholm, Sweden

[73] Assignee: Lagaholm A B, Laholm, Sweden

[22] Filed: Jan. 24, 1972

[21] Appl. No.: 220,305

[30] Foreign Application Priority Data
Jan. 25, 1971 Sweden.............................. 788/71

[52] U.S. Cl.................................. 214/515, 254/45
[51] Int. Cl............................................. B60p 1/64
[58] Field of Search................... 214/515; 296/35 A; 254/45

[56] References Cited
UNITED STATES PATENTS

| | | | |
|---|---|---|---|
| 2,925,930 | 2/1960 | Parks.................................. | 214/515 |
| 3,363,803 | 1/1968 | Abolins......................... | 296/35 A X |
| 2,898,872 | 8/1959 | Hastings, Jr. ................. | 296/35 A X |
| 2,985,482 | 5/1961 | Lion................................. | 254/45 X |
| 3,521,902 | 7/1970 | Akers............................. | 214/515 X |

FOREIGN PATENTS OR APPLICATIONS

| 1,164,669 | 9/1969 | Great Britain...................... | 214/515 |

*Primary Examiner*—Albert J. Makay
*Attorney*—J. King Harness et al.

[57] ABSTRACT

A load-receiving platform with means enabling it to be supported on for instance lorries, railway-carriages, and ships, and removably secured thereto during transport, and with legs supporting the platform during loading, said legs being arranged for displacement upwards during transport and being supported on holders, having means to permit said holders to be moved aside to increase the lateral distance between said support legs.

3 Claims, 5 Drawing Figures

PATENTED NOV 20 1973
3,773,199
SHEET 2 OF 3

PATENTED NOV 20 1973 3,773,199

REMOVABLY SUPPORTED LORRY PLATFORM

BACKGROUND OF THE INVENTION

The present invention relates to load-receiving platforms of the type which are removably supported on a lorry, truck or similar vehicles of transportation.

The purpose of the present invention is to provide a load-receiving platform of essentially rectangular configuration and having vertical wall sections along its sides, said platform being so devised that it may be readily and conveniently lifted and handled by cranes, fork-lift trucks and similar mechanisms and that without risk of tilting it may be transported on lorries having a comparatively narrow chassis, on railway-carriages, cargo ships and other land-going or sea-going vehicles of transportation.

SUMMARY OF THE INVENTION

The invention thus concerns a universal loading platform. The platform in accordance with the invention is characterised by, in combination, the provision of corner boxes at all four corners of the platform, said boxes having bottom holes to receive therein upright guide pins positioned on railway carriages or other vehicles, and wall holes for insertion therethrough of locking bolts, upwardly displaceable legs at all four corners of the platform, openings provided at the side sections of the platform to permit insertion through said openings of the lifting forks of a fork lift, and longitudinal support beams provided at the lower surface of the platform, said beams having flanges adapted by means of locking means to be secured to the loading vehicle during transport.

BRIEF DESCRIPTION OF THE DRAWINGS

The invention will be described more in detail in the following with reference to the accompanying drawings, wherein.

DETAILED DESCRIPTION OF A PREFERRED EMBODIMENT

Figure 2:
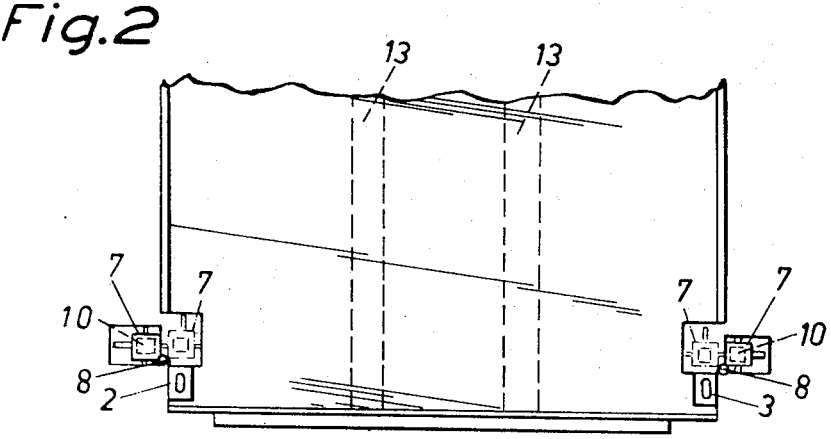
FIG. 2 is a plan view of one end of the loading platform.

The loading platform 1 illustrated in the drawings is provided at each corner with a post 2, 3. At their upper ends, the posts 2, 3 are provided with mountings 4 to permit the platform to be lifted by means of a lifting crane of yoke type and lifting hooks suspended at the end thereof. At each one of the four platform corners there is a corner box 5 in the bottom surface of which holes are provided to receive therein vertical guide bolts provided on, for instance, railroad-carriages or cargo ships on which the loading platform is to be transported. The walls of the corner boxes 5 have openings 6 through which locking bolts may pass so as to permit the loading platform to be removably secured to the guide bolts. Vertical holders 7 are also provided at the four corners of the loading platform, these holders being journalled on vertical hinges 8 or similar means on the platform such that they may be swung outwards from the position shown in dash-and-dot lines in FIG. 2. At the lower end each such holder 7 supports a telescopically extensible leg 10 which is mounted on a horizontal bolt 9 for turning movement about said bolt and which leg may be secured in its folded-down position by means of a bolt 11.

Openings 12 are provided in the side sections of the loading platform 1, these openings being dimensioned and positioned relatively each other such as to permit the lifting forks of a fork lift truck to be inserted through said openings for displacement of the loading platform.

Figure 3:
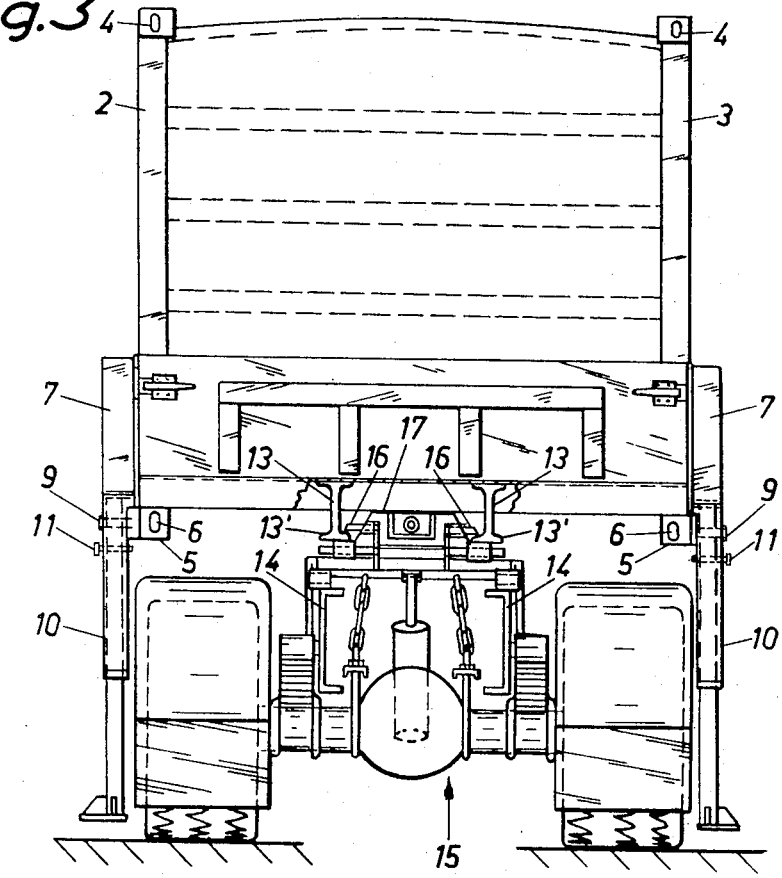
FIG. 3 is a rear view of a loading vehicle supporting a loading platform in accordance with the invention.

The platform has two longitudinally extending I-section iron bars 13 serving as support beams. The lower flange 13' of each support beam extends below the bottom surface of the platform 1 and is used to lock the platform to the chassis 14 of a lorry 15 on which the platform is to be transported. The lorry illustrated in FIG. 3 is provided with locking pins 16 which, in the locking position, extend over and engage the flanges 13' and which are mounted on a lifting frame 17 on the chassis 14.

Foldable flaps 18, 19 are provided on both the longitudinal and the transverse walls of the platform 1 and a cover 20 may enclose the entire load.

Figure 1:
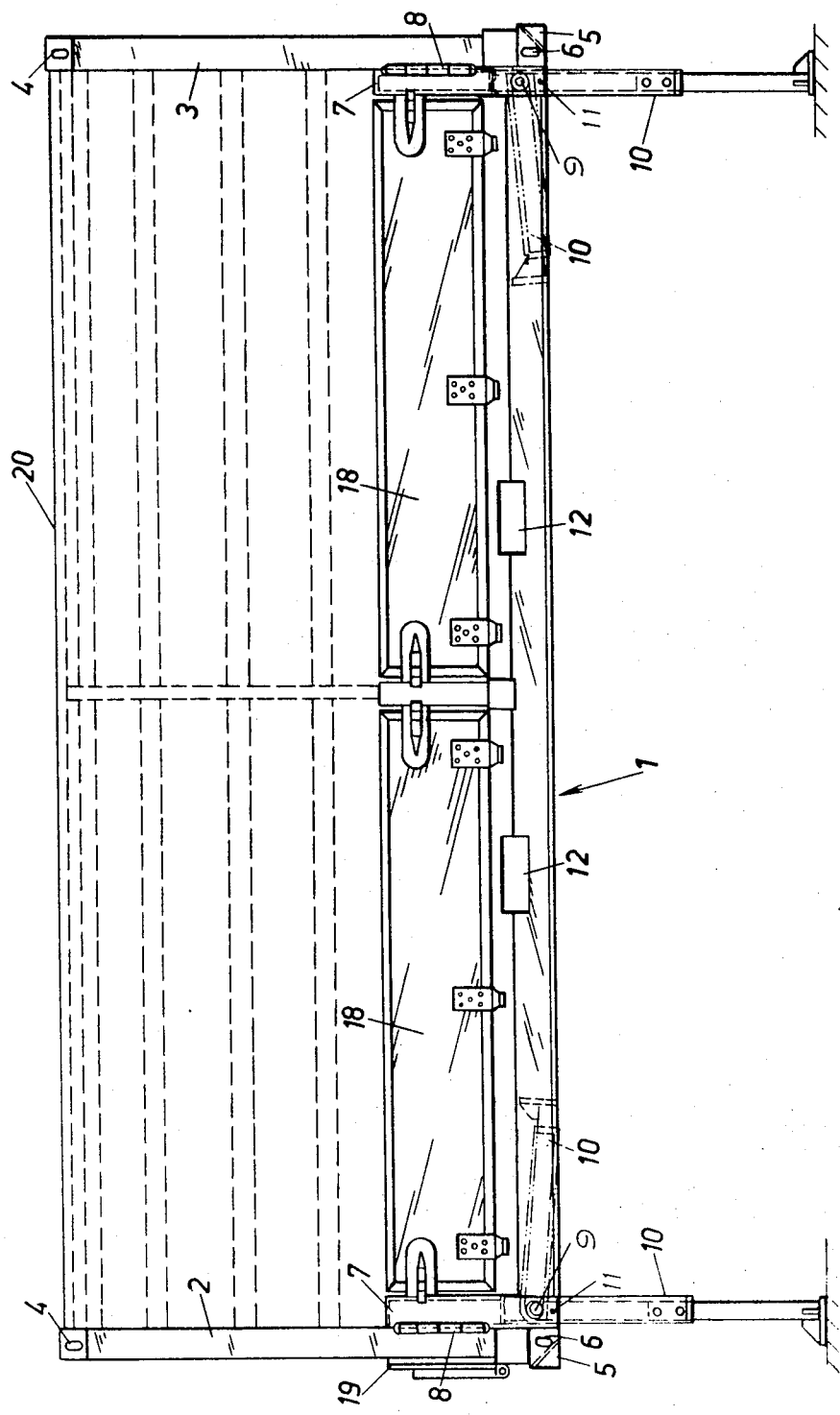
FIG. 1 is a side view of a loading platform in accordance with the invention, the platform being supported on its legs.

When the loading platform 1, for instance while supported on its legs 10, has been loaded and the cover 20 arranged over the load, the lorry 15 is moved backwards such that its rear takes a position underneath the platform-reversing of the lorry being facilitated due to the swingable arrangement of the holders 7 which are previously swung away to increase the lateral distance between the legs 10 — and the entire loading platform is hoisted by means of the lifting frame 17 and secured thereto by means of the locking pins 16. The legs 10 are thereafter swung upwards (this position being indicated with dash-and-dot lines in FIG. 1) and the lorry may be driven for instance to the loading quay of a harbour. At this point, the loading platform is lifted by a crane, the lifting hooks of which, mounted at the ends of two lifting yokes, having been secured in the platform mountings 4, and the platform is thereafter transferred onto a ship and lowered into the cargo-space or onto the deck, care being taken that upright guide pins thereon will engage in the corner boxes 5 of the platform. The platform is thereafter fastened by means of locking pins inserted through the holes 6, and the guide pins. At arrival, unloading from the ship is carried out in the same simple manner with the aid of a lifting crane and, if desired, the loading platform may be lifted onto a railway-carriage having corresponding upright locking pins to which the platform may be removably secured. A fork lift truck may be used to unload the platform from the railway-carriage, should no lifting crane be available, in which case the lifting fork of the fork lift is inserted into the side openings 12 on the platform. When the legs 10 have been swung downwards, the fork lift may deposit the loading platform on the ground. By means of a lorry 15 it is thereafter possible to move the loading platform with the entire load supported thereon to the point of destination.

Figure 4:
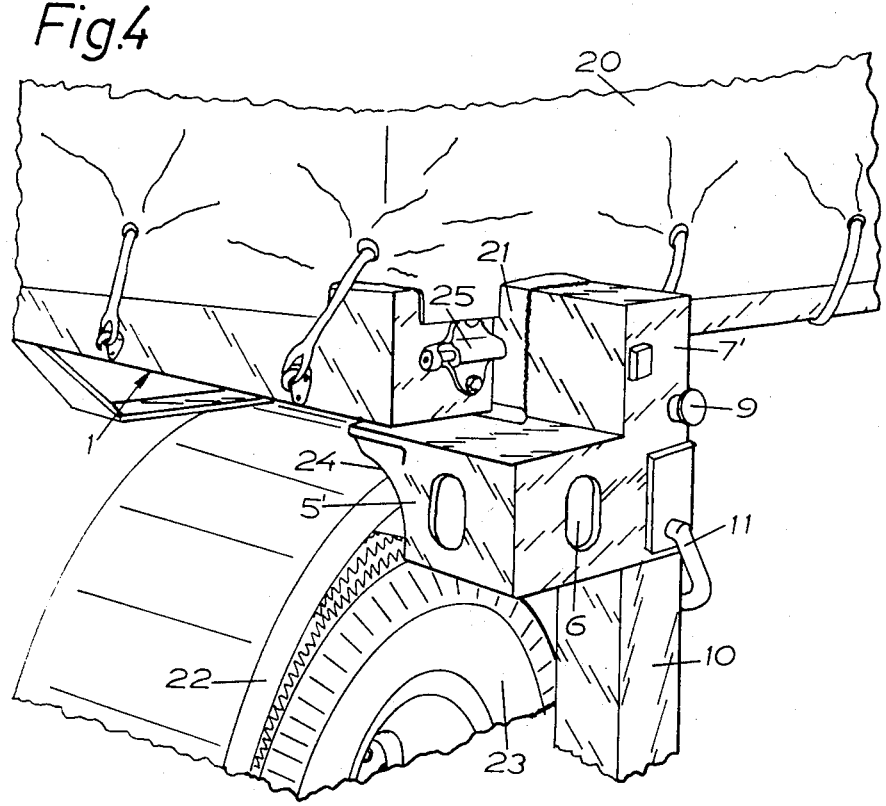
FIG. 4 is a perspective view of a loading platform as seen obliquely from the front incorporating a modified embodiment of the means for displacing the support legs laterally, and illustrating one of the support legs being moved outwards to facilitate reversing of a lorry in underneath the platform.
Figure 5:
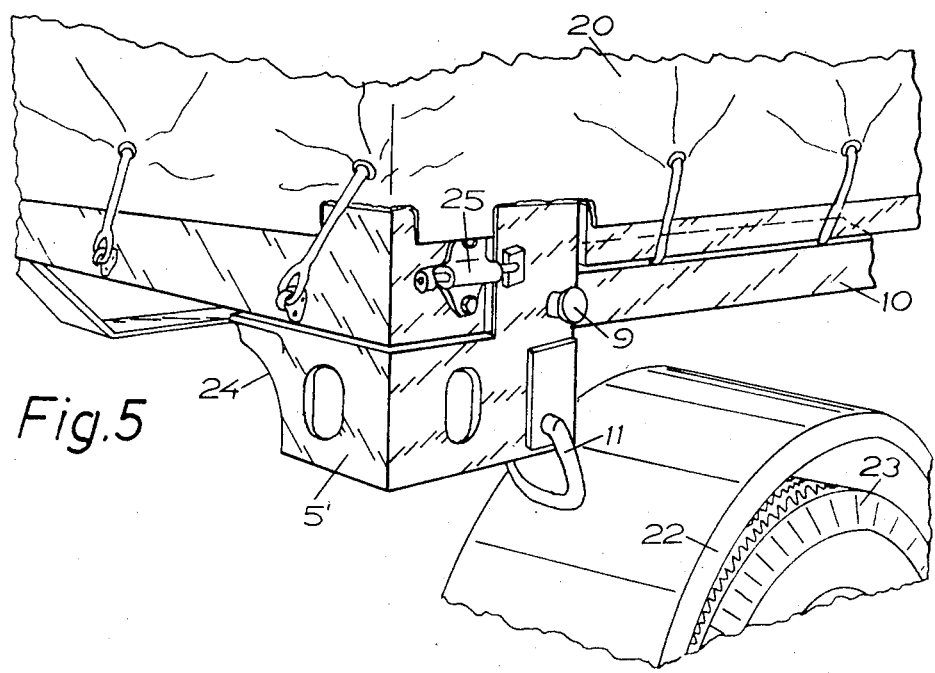
FIG. 5 is a similar perspective view illustrating the support leg having been moved to its inner position and displaced upwards in driving position.

In accordance wite the embodiment illustrated in FIGS. 4 and 5 the lower corner box 5' is rigidly connected to the holder 7' supporting the adjacent leg 10. The holder 7' is provided with a preferably tubular guide rod 21 which is slidably mounted in a transverse guide (not shown) integral with the lower part of the platform 1. Owing to this arrangement, the holder and the leg 10 associated therewith, the upper end of which is mounted for swinging movement about the bolt 9, as well as the corner box 5' associated with the holder, all become displaceable from an inner position wherein the holder and corner box lie within the contour of the platform 1 (FIG. 5) to an outer position (FIG. 4) wherein the leg assumes a position at a distance of, e.g., 20 centimeters to the side of the platform. In this outer position, also the corner box 5', having an inner support edge 24 with a curved configuration corresponding to the shape of the mudguard 22 above the vehicle running wheel 23, is positioned at the side of the platform. These arrangements make it easy for the driver to reverse the vehicle, positioning the rear thereof underneath the platform 1 while the latter is supported on its legs 10.

When the platform 1 has been lifted by means of the vehicle lifting frame 17, the holders 7' together with the associated legs 10 and corner boxes 5' are moved to the inner position (FIG. 5) in which they are locked by a blocking means 25, whereupon the legs are pushed upwards (FIG. 5) and the platform is ready to be carried away on the vehicle.

The embodiment as described and illustrated is to be regarded as an example only and the various details of the loading platform may be constructively altered in a variety of ways within the scope of the appended claims. For instance, the loading platform may be provided with solid side walls and short-end walls as well as with a roof; in other words, it may consist of a container having standard measures, e.g. a 20 foot ISO-container having corner boxes 5 at all eight corners.

What I claim is:

1. A load-receiving platform of essentially rectangular configuration having vertical wall sections along its sides, said platform being removably supported on a lorry, truck or similar loading vehicle, characterized by, in combination,
   one corner box positioned at each one of the four corners of said platform, comprising bottom holes in each such box for receiving therein guide pins arranged on railway-carriages or other vehicles of transportation, and holes in the walls of said box for receiving locking bolts therein to removably lock said platform to said vehicle,
   support legs, one such leg being arranged at each one of said four corners of said platform,
   one holder for each support leg, a horizontal shaft carried by each holder and pivotally supporting the respective support leg for swinging movement,
   means to secure each support leg in a vertical position against the respective holder,
   said holders being movably supported between a position in which a truck body may pass between the extended support legs and a position spaced inwardly therefrom,
   openings made in said side sections of said platform to permit insertion through said openings of the lifting fork of a fork lift, and
   longitudinal support beams extending along the lower face of said platform and comprising flanges, locking means being provided to retain said beam flanges in engagement with said loading vehicle during transport.

2. A load-receiving platform as set forth in claim 1 wherein the holders are slidably supported for movement between their positions.

3. A load-receiving platform as set forth in claim 1 wherein the holders are supported for pivotal movement between their positions about vertically extending axes.

* * * * *